(12) United States Patent
Winter

(10) Patent No.: US 8,208,854 B2
(45) Date of Patent: Jun. 26, 2012

(54) BLUETOOTH CONTROL FOR VOIP TELEPHONY USING HEADSET PROFILE

(75) Inventor: Richard Winter, Bristol (GB)

(73) Assignee: Plantronics, Inc., Santa Cruz, CA (US)

(*) Notice: Subject to any disclaimer, the term of this patent is extended or adjusted under 35 U.S.C. 154(b) by 1043 days.

(21) Appl. No.: 12/141,811

(22) Filed: Jun. 18, 2008

(65) Prior Publication Data

US 2009/0318081 A1 Dec. 24, 2009

(51) Int. Cl.
*H04B 7/00* (2006.01)
(52) U.S. Cl. ........................ 455/41.3; 455/41.2
(58) Field of Classification Search .............. 455/41.2, 455/41.3
See application file for complete search history.

(56) References Cited

U.S. PATENT DOCUMENTS

| | | | | |
|---|---|---|---|---|
| 7,209,470 B2* | 4/2007 | McGowan | | 370/349 |
| 7,233,808 B2* | 6/2007 | Mooney et al. | | 455/557 |
| 7,280,097 B2* | 10/2007 | Chen et al. | | 345/156 |
| 7,436,300 B2* | 10/2008 | Glass et al. | | 340/568.1 |
| 7,762,470 B2* | 7/2010 | Finn et al. | | 235/492 |
| 7,801,561 B2* | 9/2010 | Parikh et al. | | 455/557 |
| 2002/0147005 A1* | 10/2002 | Tezuka et al. | | 455/418 |
| 2002/0167932 A1* | 11/2002 | McGowan | | 370/349 |
| 2003/0045235 A1* | 3/2003 | Mooney et al. | | 455/41 |
| 2004/0044913 A1* | 3/2004 | Wu | | 713/202 |
| 2005/0096086 A1* | 5/2005 | Singamsetty | | 455/557 |
| 2006/0007126 A1* | 1/2006 | Shih | | 345/156 |
| 2006/0105712 A1* | 5/2006 | Glass et al. | | 455/41.2 |
| 2006/0268329 A1* | 11/2006 | Lo | | 358/1.15 |
| 2007/0105548 A1* | 5/2007 | Mohan et al. | | 455/426.1 |
| 2007/0223430 A1* | 9/2007 | Desai et al. | | 370/338 |
| 2007/0264988 A1* | 11/2007 | Wilson et al. | | 455/416 |
| 2007/0287493 A1* | 12/2007 | Stephens | | 455/550.1 |
| 2008/0080703 A1* | 4/2008 | Penning et al. | | 379/428.02 |
| 2008/0081667 A1* | 4/2008 | Parikh et al. | | 455/558 |
| 2008/0211667 A1* | 9/2008 | Hulvey | | 340/539.27 |
| 2008/0211774 A1* | 9/2008 | Woo | | 345/166 |
| 2009/0022117 A1* | 1/2009 | Quigley et al. | | 370/338 |
| 2009/0305632 A1* | 12/2009 | Sarkissian et al. | | 455/41.2 |

\* cited by examiner

*Primary Examiner* — Lewis West
(74) *Attorney, Agent, or Firm* — Chuang Intellectual Property Law

(57) ABSTRACT

Systems and methods for Bluetooth Control for VoIP telephony using the Bluetooth Headset Profile are presented. A Bluetooth Headset Profile volume control command message is received and translated to a corresponding USB HID profile menu up or menu down command message. A Bluetooth Headset Profile hookswitch command message is received and translated to a USB HID profile menu item select command message.

25 Claims, 9 Drawing Sheets

From block 810, 814, 820, 824

Rcv audio file from HI App corresponding to menu up or menu down item
826

FIG. 8B

BLUETOOTH CONTROL FOR VOIP TELEPHONY USING HEADSET PROFILE

BACKGROUND OF THE INVENTION

The use of Bluetooth wireless networks with headsets is a fast growing trend in the telephony industry, providing mobility and hands-free operation. In addition, the use of Voice over Internet Protocol (VoIP) has also increased, displacing circuit switch analog and digital telecom systems. Voice over Internet Protocol transmits voice over a data network utilizing Internet Protocol (IP) data packets. In VoIP, analog speech signals received from an audio source are digitized, compressed, and translated into IP packets for transmission over an IP network such as the Internet. Some benefits of VoIP include cost savings and new applications. For example, VoIP can be used to bypass the toll structure imposed by the service providers that operate the public switched telephone network (PSTN) or combined with other Internet services such as embedding voice mail messages into user e-mail.

The Bluetooth specification sets forth a Headset Profile protocol specifically directed at headset wireless communications. The Headset Profile is described in part K6 of the Bluetooth specification, which is hereby incorporated by reference. The Headset Profile relies on SCO for audio encoded in 64 kbit/s pulse code modulation (PCM) or continuously variable slope modulation delta (CVSD) and a subset of AT commands as set forth in global system for mobile communication (GSM) 07.07 for minimal controls, including the limited ability to ring, answer a call, hang up, and adjust the volume. Although only minimal controls are provided for, the Headset Profile protocol is advantageous as it does not mandate features typically undesired in headset applications which are required by other profiles, such as the Hands Free Profile.

In VoIP systems where the headset is utilized with a personal computer (PC), certain configurations utilize a Bluetooth USB (Universal Serial Bus) adapter coupled to the personal computer to effect wireless communications between the headset and a VoIP application running on the PC. Current VoIP solutions using the Bluetooth Headset Profile map button presses on the headset to USB HID (Human Interface Device) commands, which are then interpreted by the VoIP application as either call answer or call end commands. This provides the user with limited call control ability. In this scenario, the user is unable to attempt to make an outgoing call. The user is also unable to reject the incoming call. The user is required to perform these and other call related functions using the PC keyboard or mouse.

In these VoIP applications, it would be advantageous of the user to be able to perform additional telecommunications operations using the headset. In this manner, the user can take advantage of the mobility offered by Bluetooth and need not be in close proximity to the personal computer.

As a result, there is a need for improved methods and systems for wireless Bluetooth headsets operating with the Bluetooth Headset Profile.

BRIEF DESCRIPTION OF THE DRAWINGS

The present invention will be readily understood by the following detailed description in conjunction with the accompanying drawings, wherein like reference numerals designate like structural elements.

FIGS. 8A and 8B are a flow diagram illustrating navigation of a menu using the Bluetooth Headset Profile and associated volume control command messages.

DESCRIPTION OF SPECIFIC EMBODIMENTS

Figure 1:
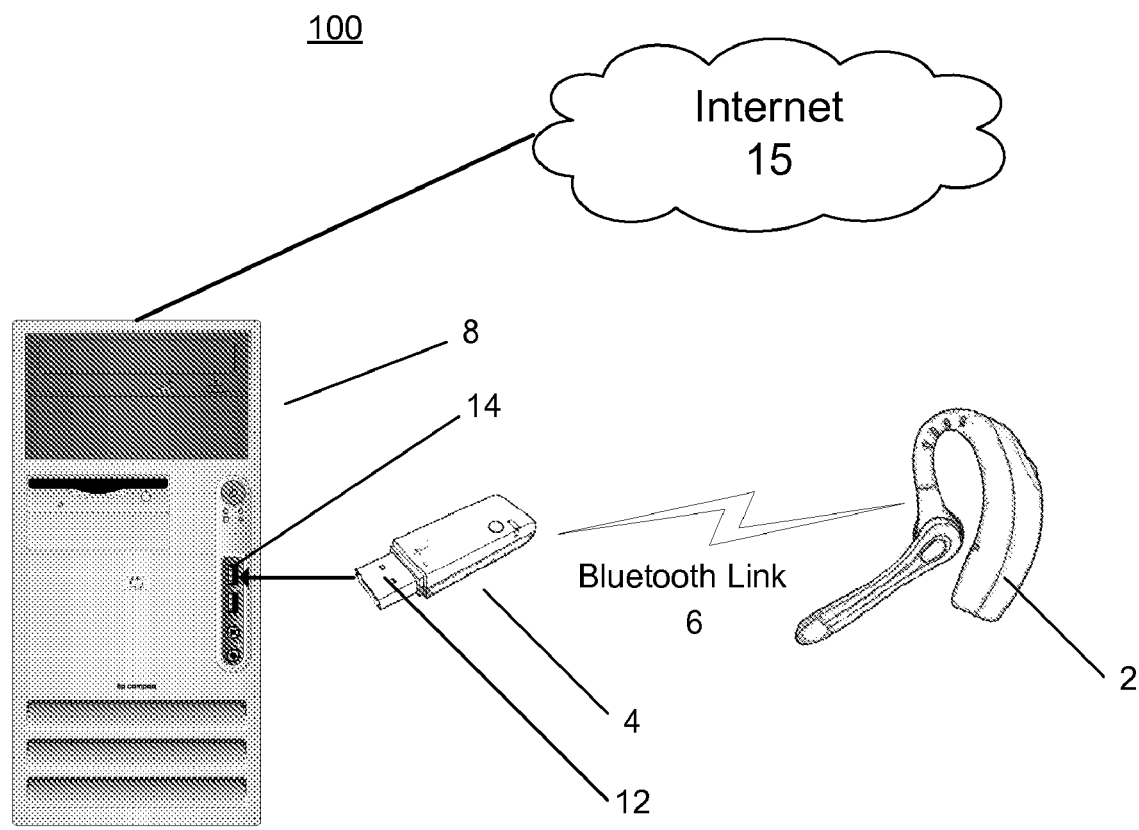
FIG. 1 illustrates a system for Bluetooth control for VoIP telephony using the Bluetooth Headset Profile in one example.

Methods and apparatuses for Bluetooth control for VoIP telephony using the Headset Profile are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to the use of a personal computer to implement VoIP telephony with a Bluetooth wireless headset. A headset interface application executed on the PC provides an intuitive means of performing call handling on third-party VoIP Softphone applications where the third party exposes an application programming interface (API). The system uses a USB interface to the headset interface application and a Bluetooth audio gateway. In one example, a user can answer or reject incoming VoIP telephone calls, and also activate outgoing calls using only the headset without the need for PC intervention. A user can launch other PC based applications, also without the need for PC intervention. In one example, the headset interface application uses a menu system to allow the user to answer or reject incoming calls. The menu system will also allow the user to initiate a call with a contact defined in a contacts folder. In further examples, a variety of enhanced call functions can be implemented with the menu system while using the Bluetooth Headset Profile, including but not limited to call initiation, call hold, and call waiting operations.

In one example, a method for menu navigation using a Bluetooth Headset Profile includes receiving a Bluetooth Headset Profile volume control setting command message comprising a received volume control setting. The received volume control setting is compared to a current volume control setting to determine a higher than current setting status, lower than current setting status, or same as current setting status. The method includes translating the Bluetooth Headset Profile volume control setting command message to a USB HID menu up command message responsive to a higher than current setting status. The method includes translating the Bluetooth Headset Profile volume control setting command message to a USB HID menu down command message responsive to a lower than current setting status.

The received volume control setting is compared to a volume minimum value and a volume maximum value responsive to a same as current setting status to determine a volume minimum value status or a volume maximum value status. The method includes translating the Bluetooth Headset Profile volume control setting command message to a USB HID menu up command message responsive to a volume maximum value status. The method further includes translating the Bluetooth Headset Profile volume control setting command message to a USB HID menu down command message responsive to a volume minimum value status. A USB HID menu down command message or the USB HID menu up command message is output. An audio file corresponding to a next menu item or a previous menu item is received.

In one example, a Bluetooth device includes a Bluetooth transceiver, a Universal Serial Bus (USB) interface, and a Bluetooth audio gateway including a control unit. The Bluetooth audio gateway receives a Bluetooth Headset Profile volume control command message from the Bluetooth transceiver and translates the Bluetooth Headset Profile volume control command message to a corresponding USB HID profile menu up or menu down command message. The Bluetooth audio gateway receives an audio file responsive to issuing the corresponding USB HID profile menu up or menu down command message.

In one example, a Bluetooth device includes a Bluetooth means such as a Bluetooth transceiver for transmitting or receiving signals in accordance with the Bluetooth protocol. The Bluetooth device includes a Universal Serial Bus means such as a USB interface for transmitting or receiving signals. The Bluetooth device further includes a translating means for receiving a Bluetooth Headset Profile volume control command message from the Bluetooth means and translating the Bluetooth Headset Profile volume control command message to a corresponding USB HID profile menu up or menu down command message. The translating means receives an audio file responsive to issuing the corresponding USB HID profile menu up or menu down command message. The translating means may, for example, be a Bluetooth audio gateway or a controller.

In one example, a method for menu item selection using a Bluetooth Headset Profile includes outputting to a headset an audio file corresponding to a menu item, receiving from the headset a Bluetooth Headset Profile hookswitch command message, translating the Bluetooth Headset Profile hookswitch command message to a USB HID menu item select command, and outputting the USB HID menu item select command to a VoIP application. In one instance, the menu item select command originates a call.

FIG. 1 illustrates a system 100 for Bluetooth control for VoIP telephony using the Bluetooth Headset Profile in one example. System 100 includes a computer 8 coupled to the Internet 15. A Bluetooth headset 2 communicates with a USB Bluetooth module 4 (also referred to as a dongle) via a digital wireless Bluetooth link 6. USB Bluetooth module 4 includes a USB interface 12 which may be inserted into a USB interface 14 of computer 8. When the computer 8 executes a Voice-Over-Internet Protocol (VoIP) software application, the Bluetooth headset 2 is operable to act as a telecommunications device.

Figure 2:
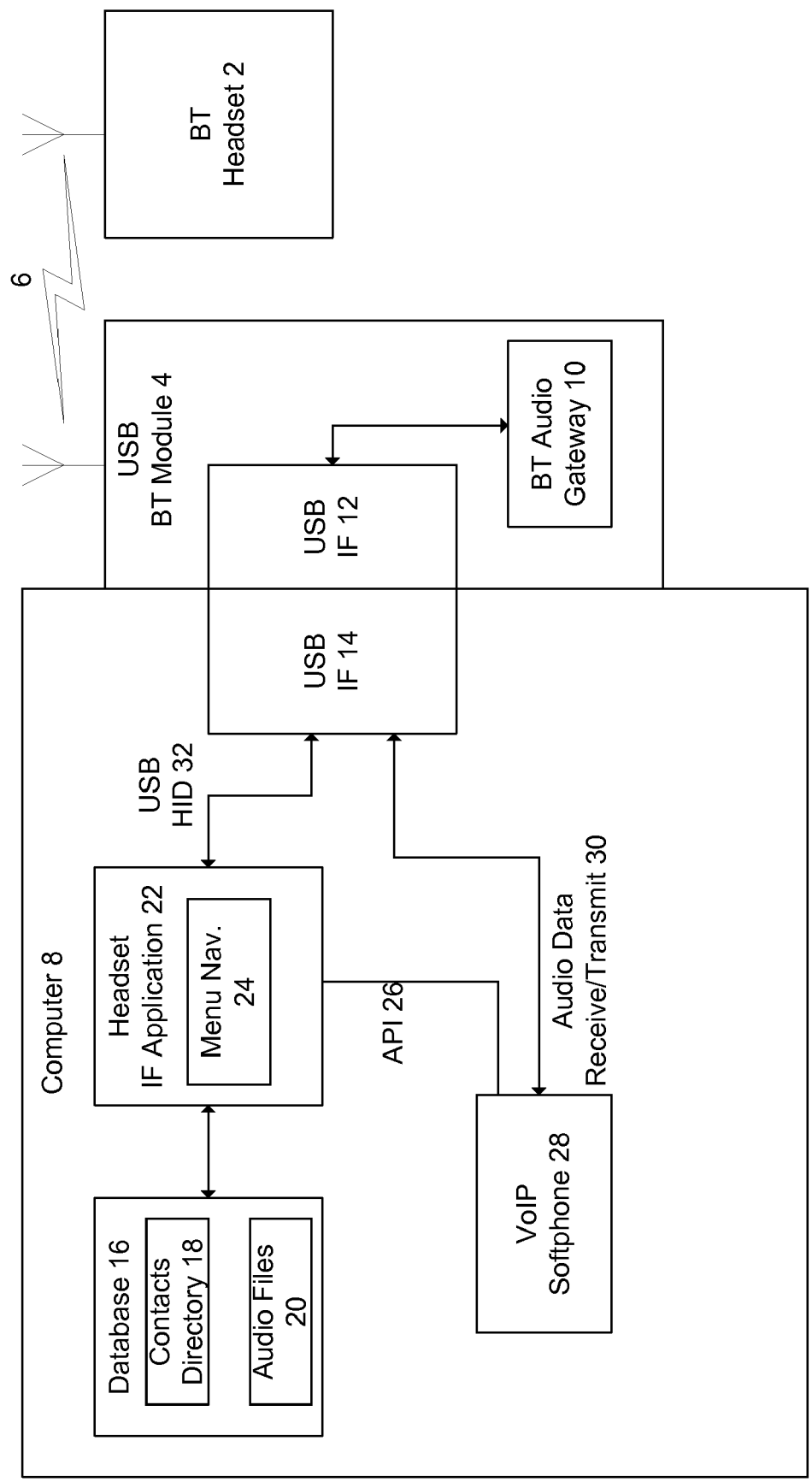
FIG. 2 illustrates a simplified block diagram of the system shown in FIG. 1.

FIG. 2 illustrates a simplified block diagram of the system shown in FIG. 1. In this example, Bluetooth headset 2 is wirelessly connected to USB Bluetooth module 4 via Bluetooth link 6. The devices in FIG. 2 communicate using the Bluetooth Headset Profile. USB Bluetooth module 4 includes a Bluetooth audio gateway 10 in communication with a USB interface 12. USB interface 12 is connected to USB interface 14 of computer 8. Computer 8 includes a headset interface application 22 to be executed on computer 8. The headset interface application 22 operates to handle communication with the USB Bluetooth module 4 through an application programming interface (API) 26 with an associated VoIP Softphone application 28 also being executed on computer 8. VoIP Softphone application 28 may, for example, be provided by a VoIP service provider. VoIP Softphone application 28 operates to handle bi-directional IP based telephony between computer 8 and the Internet 15.

Bluetooth audio gateway 10 is the gateway for both input audio and output audio. The Bluetooth headset 2 acts as remote audio input and output mechanism for the Bluetooth audio gateway 10. The Bluetooth audio gateway 10 and Bluetooth headset 2 provide serial port emulation. The serial port emulation is used to transport user data including AT commands from the Bluetooth headset 2 to the Bluetooth audio gateway 10. The AT commands are parsed by the Bluetooth audio gateway 10 and responses are sent to the Bluetooth headset 2. Further operation of the Bluetooth audio gateway 10 is described below.

Computer 8 includes a database 16 storing a contacts directory 18 and audio files 20. Headset interface application 22 includes a menu navigation module 24 accessing contacts directory 18 and audio files 20. Directory 18 associates names and phone numbers and is stored in memory. Directory 18 may be loaded into the computer 8 through synchronization means, such as through the user's Microsoft Outlook address book on the computer. In one example, the directory 18 contains session initiation protocol (SIP) uniform resource identifiers (URIs) which are used directly to originate calls. Alternatively, the directory 18 may contain phone numbers which are used to construct a SIP URI. A VoIP call is originated by initiating a call originate request message including the associated phone number or SIP URI, through the VoIP protocol.

On the computer 8, the headset interface application 22 converts the control and audio signals between USB interface 14 and the VoIP Soft Phone 28. The headset interface application 22 program exchanges control data or control messages preferably using USB HID class data 32 via the USB interface 14. Bi-directional audio data are preferably exchanged directly by the VoIP Softphone application 28 on the computer 8 using audio class input/output data via the USB interface 14. The headset interface application 22 and the VoIP Softphone application 28 exchange data via the Application Programmable Interface (API) 26. The VoIP Softphone application 28 handles the data exchange with the Internet Protocol connection.

The VoIP Softphone application 28 can be such as the one provided by a third party with which headset interface application 22 is adapted to communicate. If an IP telephone call request is received from the USB Bluetooth module 4, a control signal is sent via the USB interface 14. The headset interface application 22 communicates this via the API 26 to the VoIP Softphone application 28, which in turn initiates the call via the Internet connection on the computer 8. If an IP telephone call is received, the VoIP Softphone application 28 informs the headset interface application 22, which sends corresponding control data to the USB Bluetooth module 4 via the USB interface 14.

Audio signals provided by the VoIP Softphone application 28 are sent via the USB interface 14 to the USB Bluetooth module 4 and then wirelessly sent to Bluetooth headset 2. Audio signals from the headset are sent via the USB Bluetooth module 4 through the USB interface 14 to the VoIP Softphone application 28. USB Bluetooth module 4 and Bluetooth headset 2 may support various audio compression formats including, for example, 7.0 kHz wideband audio compression formats.

Bluetooth audio gateway 10 receives Headset Profile command messages received at USB Bluetooth module 4. The Headset Profile command messages received are translated to corresponding USB HID menu navigation command messages. These command messages may be vender specific commands. The Headset Profile includes a Headset Control protocol at both the Bluetooth audio gateway 10 and Bluetooth headset 2 responsible for headset specific control signaling. The headset specific control signaling is AT command based. The profile stack for the Headset Profile illustrating the protocols and entities regarding how a headset and audio gateway interact to effect a wireless connection between the devices is known in the art.

The USB HID menu navigation command messages are then communicated between the USB interface 12 of USB Bluetooth module 4 and the headset interface application 22. The USB interface 12 uses a vendor defined usage page of the HID class data to communicate the auxiliary data command messages.

Figure 3A:
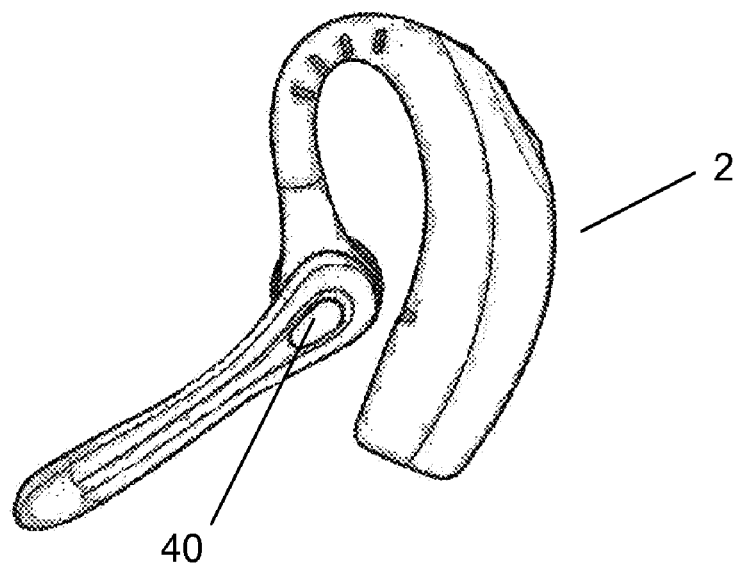
FIG. 3A illustrates a front perspective view of the Bluetooth headset shown in FIG. 2.
Figure 3B:
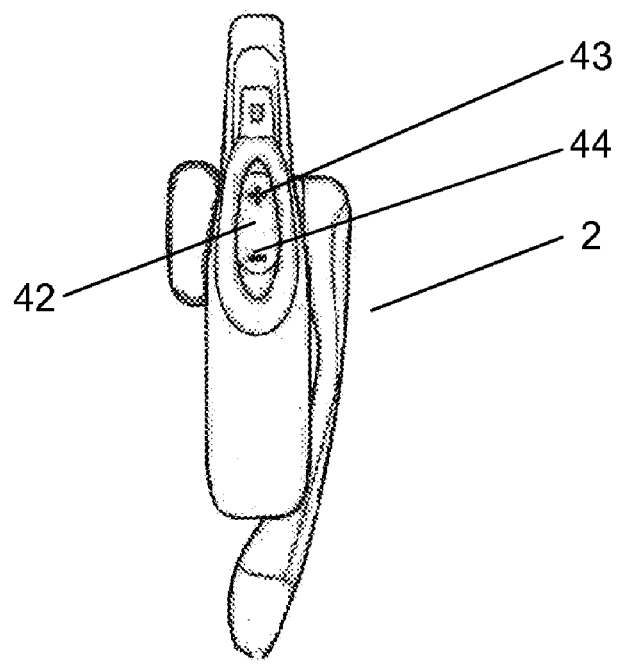
FIG. 3B illustrates a side perspective view of the Bluetooth headset shown in FIG. 2.

FIGS. 3A and 3B illustrate a front and side perspective view of the Bluetooth headset 2 shown in FIG. 2. Headset 2 includes a user interface such as rocker input 42 having a volume up input 43 and a volume down input 44. Headset 2 further includes a hookswitch button 40 (also referred to as a call control button). One of ordinary skill in the art will recognize that a variety of user interface input mechanisms may be used which allow the user to input a volume up command, volume down command, or hookswitch control command.

Figure 4:
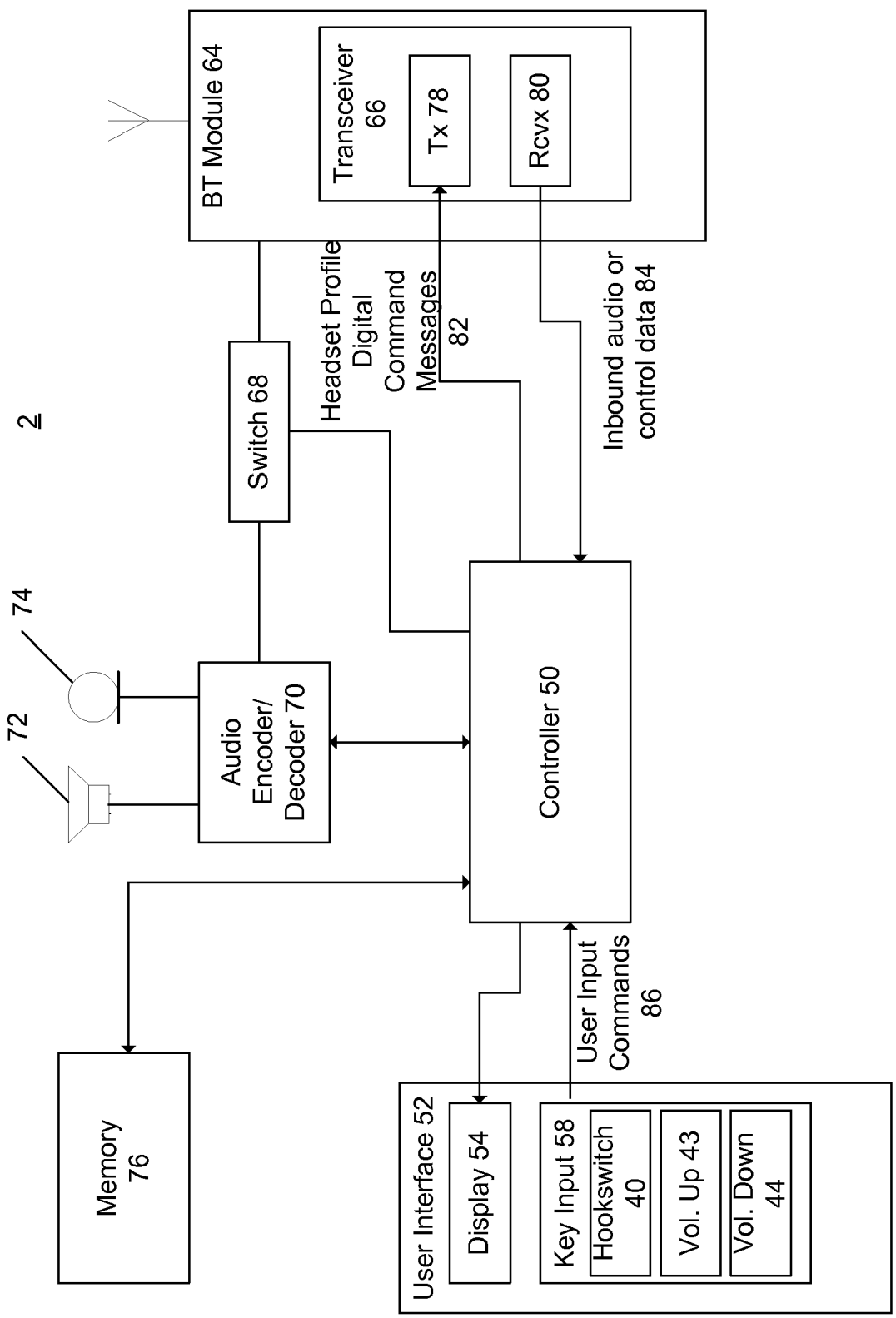
FIG. 4 illustrates a simplified block diagram of the Bluetooth headset shown in FIG. 2.

FIG. 4 illustrates a simplified block diagram of the Bluetooth headset 2 shown in FIG. 2. For clarity, not all components of the Bluetooth headset 2 are illustrated. The Bluetooth headset 2 includes a Bluetooth module 64, an audio encoder/decoder 70, memory 76, controller 50, user interface 52, switch module 68, speaker 72, and microphone 74. User interface 52 includes a display 54 and key input 58. Key input 58 includes a hookswitch 40, volume up input 43 and volume down input 44. Switch module 68 is connected to the audio encoder/decoder 70, controller 50, and Bluetooth module 64. Through switch module 68, the audio encoder/decoder 70 can transfer data with either the Bluetooth module 64 or the controller 50.

Bluetooth module 64 includes a transceiver 66 having a transmitter 78 and a receiver 80. In the present example, Bluetooth module 64 receives and transmits a wireless signal utilizing the Bluetooth protocol Headset Profile. The wireless signal transmitted by transmitter 78 includes Headset Profile command messages 82 received from controller 50. Inbound data or audio is received by receiver 80 and sent to controller 50. Audio encoder/decoder 70 is used for processing a digital audio signal and an analog audio signal as known in the art. Memory 76 is used to store digital data, and can take a variety of well known forms, such as flash memory.

Controller 50 is operable to receiver user input commands 86 from user interface 52, and convert these commands to Headset Profile digital command messages 82. In one example, controller 50 is part of a Bluetooth chip set. These Headset Profile digital command messages 82 are sent to Bluetooth module 64 for wireless transmission using Bluetooth module 64. Controller 50 also receives inbound audio or audio files for output by speaker 72 following decoding by audio encoder/decoder 70. In the present example, user interface 52 allows a user to navigate a menu and select menu items while the headset is operating in Headset Profile mode. For example, a user can scroll through a menu of contacts and select a contact with which to initiate a call to. User interface 52 can be any combinations of visual interfaces, tactile interfaces, and/or an audio interface that allow the user to input commands.

Figure 5:
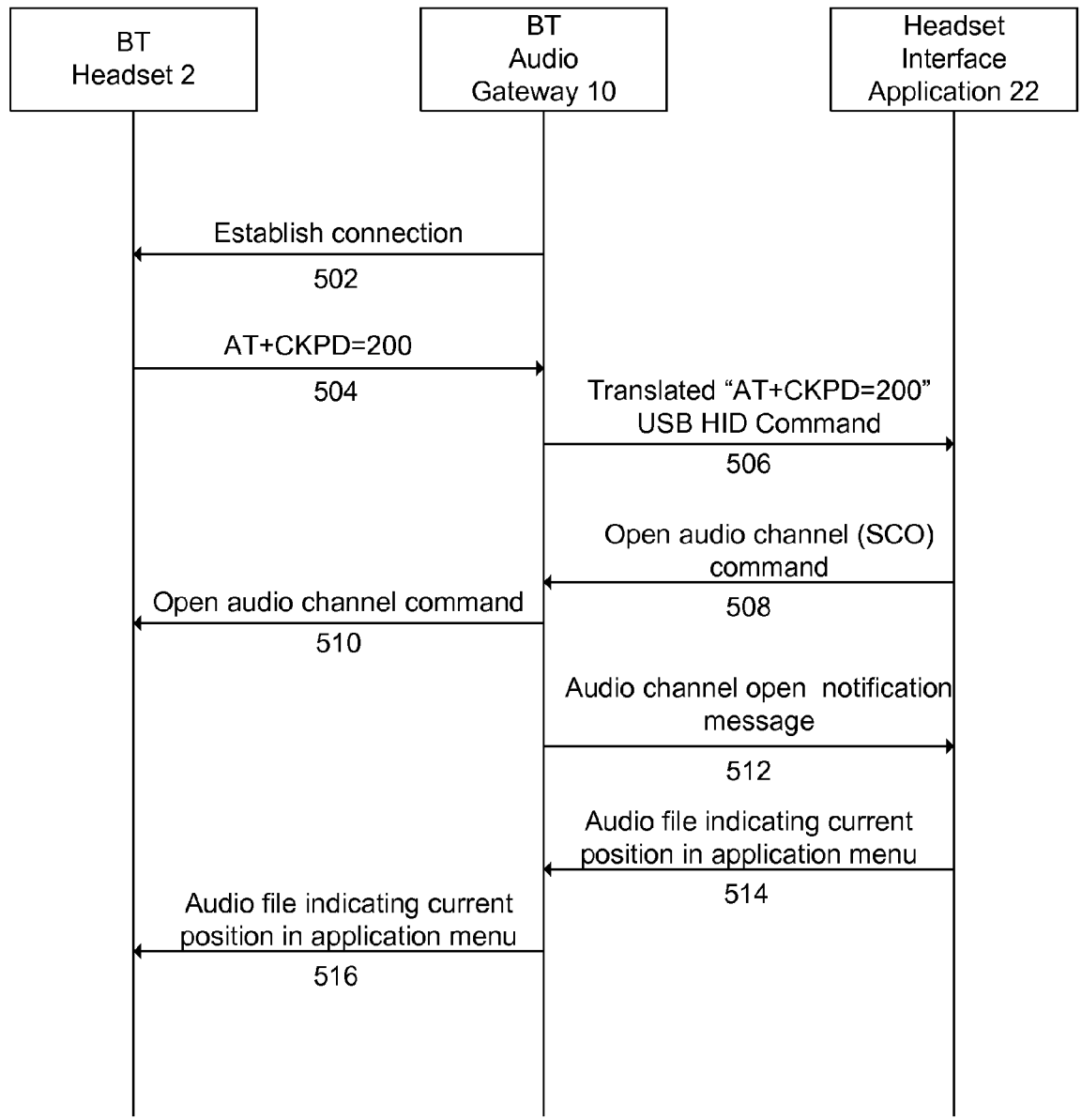
FIG. 5 illustrates establishment of a connection between a Bluetooth headset and a headset interface application menu via a Bluetooth audio gateway.

FIG. 5 illustrates establishment of a connection between a Bluetooth headset 2 and a headset interface application 22 menu via a Bluetooth audio gateway 10 using the Bluetooth Headset Profile, whereby a menu system is activated using a button press or other input on Bluetooth headset 2. A prerequisite for the application is that the Bluetooth headset 2 and the Bluetooth audio gateway 10 are paired and connected. From the idle state, the menu will be activated using a button press on the headset. The button press on the Headset will cause the Headset to issue an AT+CKPD=200 message to the audio gateway (AG). The Bluetooth audio gateway 10 will convert this into a USB based HID command, and pass this through to the headset interface application 22 on the computer 8. Once the headset interface application 22 receives the HID command, it will instruct the audio gateway to open an Audio Channel (SCO) with the Bluetooth headset 2. As soon as the SCO channel has been successfully opened, the Bluetooth audio gateway 10 will inform the headset interface application 22 that the SCO has been opened. Once the headset interface application 22 is informed that the SCO has been successfully opened, it will play an audio file, indicating the current position in the application menu.

Referring again to FIG. 5, at step 502, the Bluetooth audio gateway 10 initiates connection establishment with the Bluetooth headset 2. At step 504, once the connection is established between Bluetooth audio gateway 10 and Bluetooth headset 2, an AT+CKPD=200 Headset Profile command message is sent from the Bluetooth headset 2 to the Bluetooth audio gateway 10 responsive to a hookswitch user input at the Bluetooth headset 2. This AT+CKPD=200 Headset Profile command message is translated at the Bluetooth audio gateway 10 to a USB HID menu current position command message. At step 506, the USB HID command message is sent to the headset interface application 22. At step 508, the headset interface application 22 issues an open audio channel (SCO) command to the Bluetooth audio gateway 10. At step 510, the Bluetooth audio gateway 10 issues the open audio channel (SCO) command to Bluetooth headset 2. At step 512, the Bluetooth audio gateway 10 sends an audio channel (SCO) open message to headset interface application 22 notifying the headset interface application 22 the SCO has been opened. At step 514, the headset interface application 22 outputs an audio file indicating the current position in the application menu to the Bluetooth audio gateway 10, which outputs the audio file to Bluetooth headset 2 at step 516 for playback to the user.

Figure 6:
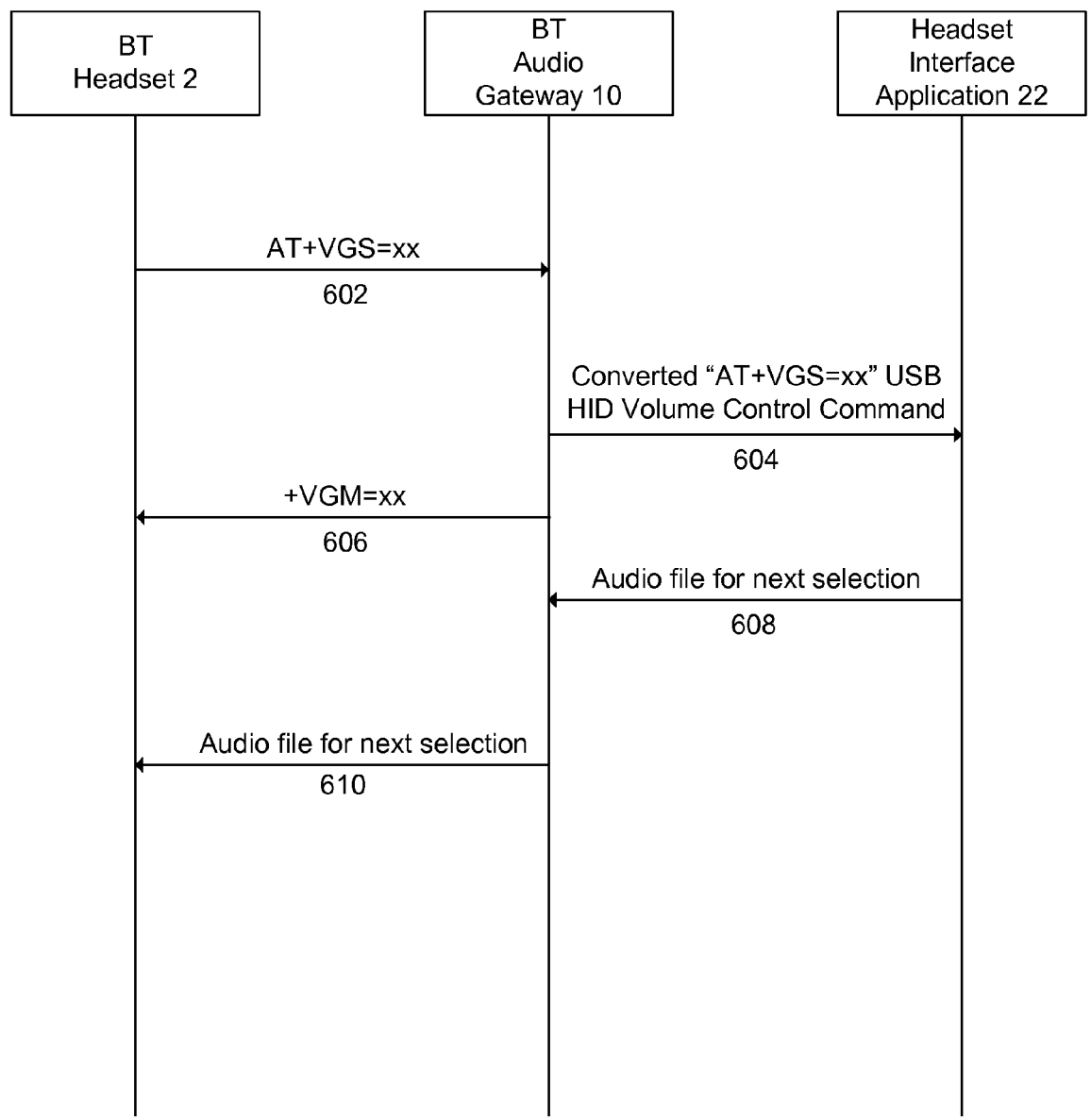
FIG. 6 illustrates navigation of a menu using the Bluetooth Headset Profile and volume control commands between a Bluetooth headset and headset interface application menu via a Bluetooth audio gateway.

FIG. 6 illustrates communication between the Bluetooth headset 2 and the headset interface application 22 menu via the Bluetooth audio gateway 10 using the Bluetooth Headset Profile, whereby the user navigates a menu by using a volume up or volume down button or other user input means on Bluetooth headset 2. Following an audio indication of the current menu position, the user is then able to either access the selection being played, or scroll up or down through the other selections in the menu.

Scrolling up and down menus is achieved by using the volume up and down buttons on the headset. When the user presses the volume up or volume down buttons to scroll through a menu, the Bluetooth headset 2 will issue an AT+VGS=xx Headset Profile message, where xx is the new volume setting value. The volume setting value parameter xx ranges on scale between zero and fifteen. Xx is an absolute value, relating to a particular implementation dependent volume level controlled by the Bluetooth headset 2. The xx value is received by the Bluetooth audio gateway 10, and the Bluetooth audio gateway 10 will determine whether the new volume setting is higher or lower than the current settings.

If the new value is higher, then the Bluetooth audio gateway 10 issues a USB HID command to the headset interface application 22 indicating that the volume up button on the Bluetooth headset 2 has been pressed. If the new value is lower, then the Bluetooth audio gateway 10 issues a USB HID command to the headset interface application 22 indicating that the volume down button on the Bluetooth headset 2 has been pressed. In the case where the volume setting value received by the Bluetooth audio gateway 10 is unchanged, then the Bluetooth audio gateway 10 issues a volume down USB HID command when the volume is at the minimum value, and a volume up USB HID command when the volume is at the maximum value.

When the headset interface application 22 receives the volume up or volume down USB HID commands, it highlights the next selection in the menu, and plays the required audio file. The headset interface application 22 also issues a command to the Bluetooth audio gateway 10, which will cause the Bluetooth audio gateway 10 to issue a +VGM=xx command to the Bluetooth headset 2, where xx is the volume setting of the headset prior to the volume up or volume down buttons being pressed. In this manner, the volume/gain output of the headset speaker is maintained at a desired level. Furthermore, this allows for unlimited menu scrolling.

Referring again to FIG. 6, at step 602, an AT+VGS=xx Headset Profile volume control command message is sent from the Bluetooth headset 2 to the Bluetooth audio gateway 10 responsive to a volume control user input at the Bluetooth headset 2. This AT+VGS=xx Headset Profile volume control command message is translated at the Bluetooth audio gateway 10 to a USB HID menu up or menu down command message. At step 604, the USB HID menu up or menu down command message is sent to the headset interface application 22. At step 606, a +VGM=xx command is sent from Bluetooth audio gateway 10 to Bluetooth headset 2 to reset the volume level setting at the headset to provide for an infinite menu navigation loop and to also maintain a desirable volume level. At step 608, the headset interface application 22 outputs an audio file indicating the next selection in the application menu to the Bluetooth audio gateway 10, which outputs the next selection audio file to Bluetooth headset 2 at step 610 for playback to the user. In one example, the audio file is a contact name.

Figure 7:
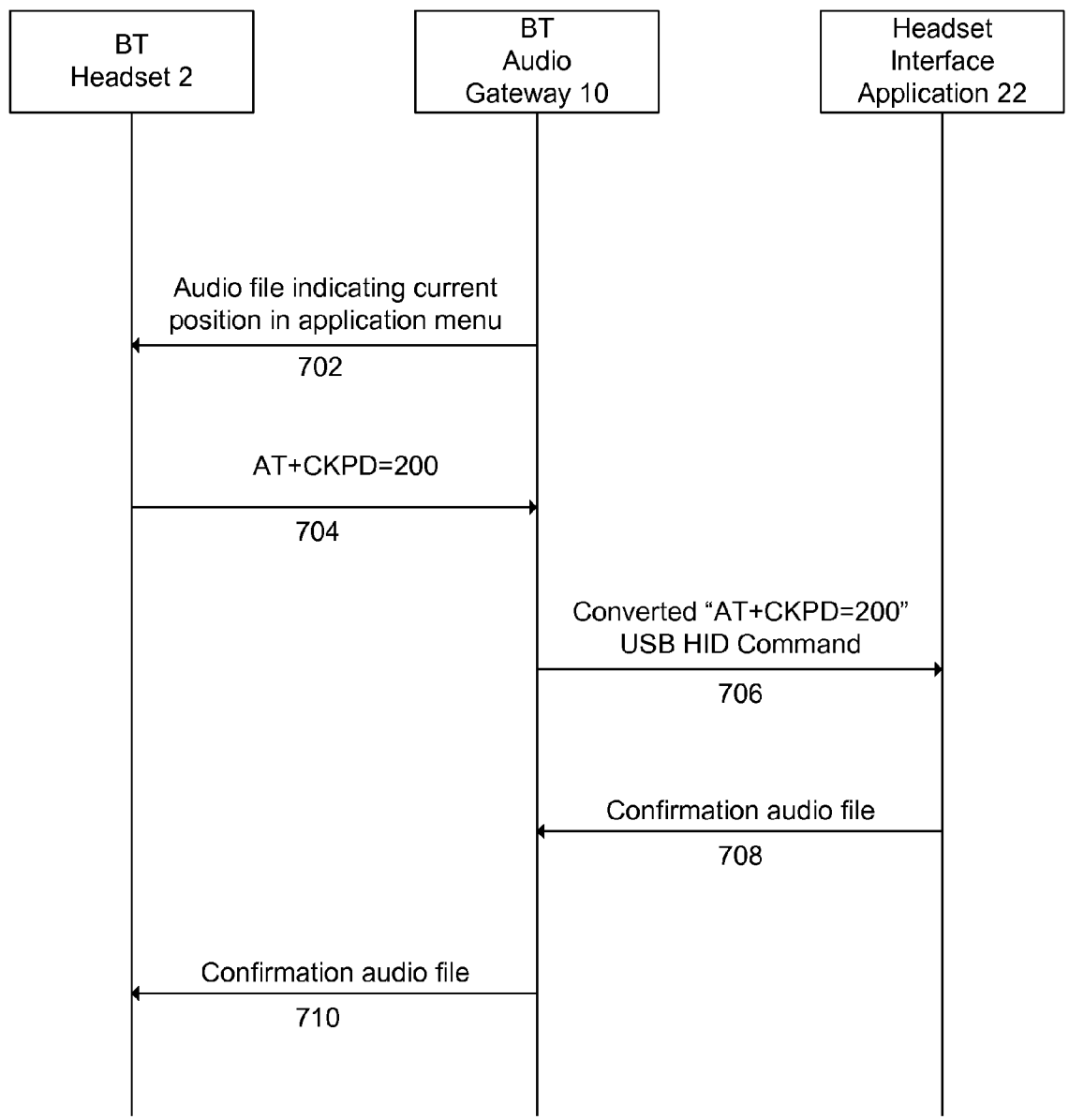
FIG. 7 illustrates selection of a menu item between a Bluetooth headset and a headset interface application menu via a Bluetooth audio gateway.

FIG. 7 illustrates communication between the Bluetooth headset 2 and the headset interface application 22 menu via the Bluetooth audio gateway 10 using the Bluetooth Headset Profile, whereby a menu item is selected using a hookswitch button press or other user input on Bluetooth headset 2. In order to access a required selection, the user is required to press the hookswitch button on the Bluetooth headset 2. This will result in the Bluetooth headset 2 issuing a AT+CKPD=200 message to the Bluetooth audio gateway 10. As before, this will be translated into a HID command, and passed to the headset interface application 22. Once the HID command is received by the headset interface application 22, it will access the required selection. A confirmation audio file will be played by the headset interface application 22 to indicate that the required selection has been actioned.

For example, the process set forth in FIG. 7 may occur following the process set forth in FIG. 6. In one example, the Bluetooth Headset Profile hookswitch command message selects a contact name in a contacts folder to be called. In a further example, the Bluetooth Headset Profile hookswitch command message rejects an incoming call. When an incoming call is received, the user may navigate the menu and select the menu item option to either answer the incoming call or reject the incoming call.

Referring again to FIG. 7, at step 702, the Bluetooth audio gateway 10 outputs an audio file indicating the current position in the application men to Bluetooth headset 2 for playback to the user. As step 704, an AT+CKPD=200 Headset Profile command message is sent from the Bluetooth headset 2 to the Bluetooth audio gateway 10 responsive to a hookswitch user input at the Bluetooth headset 2. This AT+CKPD=200 Headset Profile command message is translated at the Bluetooth audio gateway 10 to a USB HID command message. At step 706, the USB HID menu item select command message is sent to the headset interface application 22. At step 708, the headset interface application 22 outputs a confirmation audio file confirming the menu item selection made by the user to the Bluetooth audio gateway 10, which outputs the confirmation audio file to Bluetooth headset 2 at step 710 for playback to the user.

Figure 8A:
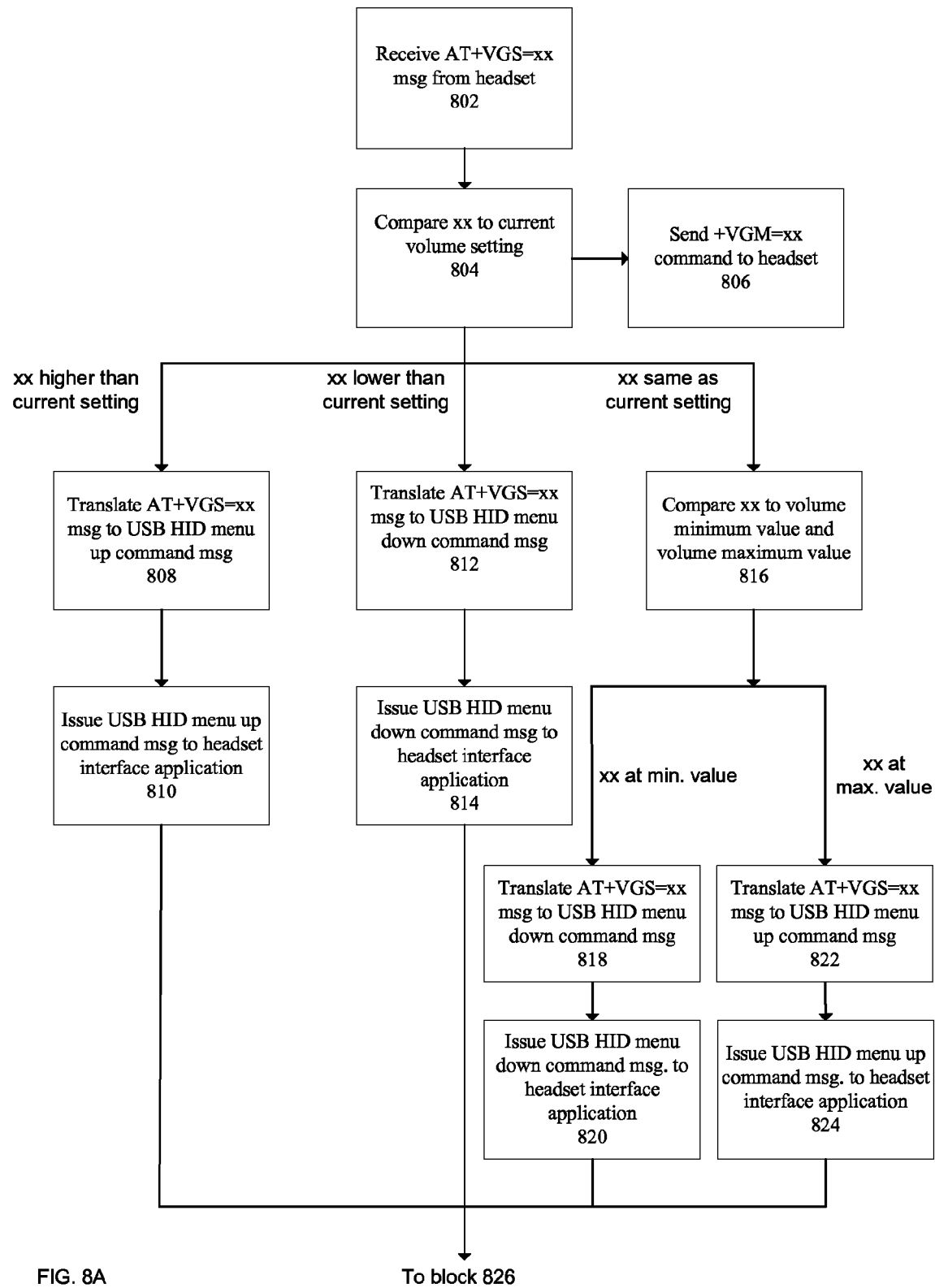

FIGS. 8A and 8B are a flow diagram illustrating navigation of a menu using the Bluetooth Headset Profile and associated volume control command messages. At block 802, an AT+VGS=xx Headset Profile volume control command message is received at a Bluetooth audio gateway 10 from the Bluetooth headset 2 responsive to a volume control user input at the Bluetooth headset 2, where xx represents a received volume setting. At block 804, the received volume setting xx is compared to a current volume setting. At block 806, a +VGM=xx command is sent from Bluetooth audio gateway 10 to Bluetooth headset 2 to reset the volume level setting at the headset to the current volume setting.

If the received volume setting xx is higher than the current volume setting at block 804, at block 808 the AT+VGS=xx Headset Profile volume control command message is translated at the Bluetooth audio gateway 10 to a USB HID menu up command message. Following block 808, at block 810 the USB HID menu up command message is issued to the headset interface application. Following block 810, at block 826, an audio file received from the headset interface application corresponding to the menu up next item.

If the received volume setting xx is lower than the current volume setting at block 804, at block 812 the AT+VGS=xx Headset Profile volume control command message is translated at the Bluetooth audio gateway 10 to a USB HID menu down command message. Following block 812, at block 814 the USB HID menu down command message is issued to the headset interface application. Following block 814, at block 826, an audio file received from the headset interface application corresponding to the menu down next item.

If the received volume setting xx is equal to the current volume setting at block 804, at block 816 it is determined whether the volume setting xx is equal to the Headset Profile volume minimum value or the Headset Profile volume maximum value. If the volume setting xx is equal to the Headset Profile volume minimum value at block 816, then at block 818 the AT+VGS=xx Headset Profile volume control command message is translated at the Bluetooth audio gateway 10 to a USB HID menu down command message. Following block 818, at block 820 the USB HID menu down command message is issued to the headset interface application. Following block 820, at block 826, an audio file is received from the headset interface application corresponding to the menu down item. In this manner, where xx is equal to the headset profile volume minimum value such as zero, a menu down command is presumed and initiated.

If the volume setting xx is equal to the Headset Profile volume maximum value at block 816, then at block 822 the AT+VGS=xx Headset Profile volume control command message is translated at the Bluetooth audio gateway 10 to a USB HID menu up command message. Following block 822, at block 824 the USB HID menu up command message is issued to the headset interface application. Following block 824, at block 826, an audio file is received from the headset interface application corresponding to the menu up item. In this manner, where xx is equal to the headset profile volume maximum value such as fifteen, a menu up command is presumed and initiated.

The various examples described above are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. Such changes may include, but are not necessarily limited to: standards to perform the VoIP call setup, signaling, and control; user interface input mechanisms to control volume or hookswitch operation at the headset. Furthermore, the functionality associated with any blocks described above may be centralized or distributed. It is also understood that one or more blocks of the headset, USB Bluetooth module, and computer may be performed by hardware, firmware or software, or some combinations thereof. Such modifications and changes do not depart from the true spirit and scope of the present invention that is set forth in the following claims.

Those skilled in the art will appreciate that the reference to the terms "VoIP" and "VoIP phone" are used in the generic sense to include any "voice-over-packet" technique or device, without limitation to a specific standard.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for menu navigation using a Bluetooth Headset Profile comprising:
   receiving a Bluetooth Headset Profile volume control setting command message comprising a received volume control setting;
   comparing the received volume control setting to a current volume control setting to determine a higher than current setting status, lower than current setting status, or same as current setting status;
   translating the Bluetooth Headset Profile volume control setting command message to a first USB HID menu up command message responsive to a higher than current setting status;
   translating the Bluetooth Headset Profile volume control setting command message to a first USB HID menu down command message responsive to a lower than current setting status;
   comparing the received volume control setting to a volume minimum value and a volume maximum value responsive to a same as current setting status to determine a volume minimum value status or a volume maximum value status;
   translating the Bluetooth Headset Profile volume control setting command message to a second USB HID menu up command message responsive to the volume maximum value status;
   translating the Bluetooth Headset Profile volume control setting command message to a second USB HID menu down command message responsive to the volume minimum value status;
   outputting the first USB HID menu down command message, the second USB HID menu down command message, the first USB HID menu up command message, or the second USB HID menu up command message; and
   receiving an audio file corresponding to a next menu item or a previous menu item.

2. The method of claim 1, wherein the Bluetooth Headset Profile volume control setting command message comprises an AT+VGS=xx message.

3. The method of claim 1, further comprising:
   receiving a Bluetooth Headset Profile hookswitch command message; and
   translating the Bluetooth Headset Profile hookswitch command message to a USB HID profile menu item select command message;
   outputting the USB HID profile menu item select command message; and
   receiving a confirmatory audio file confirming a menu item select.

4. The method of claim 3, wherein the Bluetooth Headset Profile hookswitch command message selects a contact name in a contacts folder to be called.

5. The method of claim 3, wherein the Bluetooth Headset Profile hookswitch command message rejects an incoming call.

6. The method of claim 3, wherein the Bluetooth Headset Profile hookswitch command message comprises an AT+CKPD=200 message.

7. The method of claim 1, further comprising sending a reset Bluetooth Headset Profile volume control setting command message to a Bluetooth headset responsive to the Bluetooth Headset Profile volume control setting command message.

8. The method of claim 7, wherein the reset Bluetooth Headset Profile volume control setting command message comprises a +VGM=xx message.

9. The method of claim 1, further comprising opening an audio channel to a headset.

10. The method of claim 1, wherein the audio file comprises a contact name.

11. A Bluetooth device comprising:
   a Bluetooth transceiver;
   a Universal Serial Bus interface;
   a Bluetooth audio gateway to receive a Bluetooth Headset Profile volume control command message from the Bluetooth transceiver and translate the Bluetooth Headset Profile volume control command message to a corresponding USB HID profile menu up or menu down command message, wherein the Bluetooth audio gateway receives an audio file responsive to issuing the corresponding USB HID profile menu up or menu down command message.

12. The Bluetooth device of claim 11, wherein the Bluetooth Headset Profile volume control command message comprises an AT+VGS=xx message.

13. The Bluetooth device of claim 11, wherein the Bluetooth audio gateway receives a Bluetooth Headset Profile hookswitch command message from the Bluetooth transceiver and translates the Bluetooth Headset Profile hookswitch command message to a USB HID profile menu item select command message.

14. The Bluetooth device of claim 13, wherein the Bluetooth Headset Profile hookswitch command message comprises an AT+CKPD=200 message.

15. The Bluetooth device of claim 13, wherein the Bluetooth Headset Profile hookswitch command message selects a contact name in a contacts folder to be called.

16. The Bluetooth device of claim 13, wherein the Bluetooth Headset Profile hookswitch command message rejects an incoming call.

17. The Bluetooth device of claim 11, wherein the Bluetooth audio gateway sends a reset Bluetooth Headset Profile volume control command message to a Bluetooth headset responsive to the Bluetooth Headset Profile volume control setting command message.

18. The Bluetooth device of claim 17, wherein the reset Bluetooth Headset Profile volume control command message comprises a +VGM=xx message.

19. The Bluetooth device of claim 11, wherein the audio file comprises a contact name.

20. A Bluetooth device comprising:
   a Bluetooth means for transmitting or receiving signals in accordance with the Bluetooth protocol;
   a Universal Serial Bus means for transmitting or receiving signals using a Universal Serial Bus; and
   a translating means for receiving a Bluetooth Headset Profile volume control command message from the Bluetooth means and translating the Bluetooth Headset Profile volume control command message to a corresponding USB HID profile menu up or menu down command message, wherein the translating means receives an audio file responsive to issuing the corresponding USB HID profile menu up or menu down command message.

21. The Bluetooth device of claim 20, wherein the translating means receives a Bluetooth Headset Profile hookswitch command message and translates the Bluetooth Headset Profile hookswitch command message to a USB HID profile menu item select command message.

22. A method for menu item selection using a Bluetooth Headset Profile comprising:
   outputting to a headset an audio file corresponding to a menu item;
   receiving from the headset a Bluetooth Headset Profile hookswitch command message;
   translating the Bluetooth Headset Profile hookswitch command message to a USB HID menu item select command; and
   outputting the USB HID menu item select command to a VoIP application to initiate a call.

23. The method of claim 22, further comprising outputting to the headset a confirmatory audio file.

24. The method of claim 22, wherein the Bluetooth Headset Profile hookswitch command message comprises an AT+CKPD=200 message.

25. The method of claim 22, wherein the Bluetooth Headset Profile hookswitch command message selects a contact name in a contacts folder to be called.

* * * * *